United States Patent
Irigi et al.

(10) Patent No.: US 9,730,230 B2
(45) Date of Patent: Aug. 8, 2017

(54) SYSTEM AND METHOD FOR PERFORMING RESOURCE ALLOCATION

(71) Applicant: Cisco Technology, Inc., San Jose, CA (US)

(72) Inventors: Srinivasa Reddy Irigi, San Jose, CA (US); RaghavendarRao Kota, Milpitas, CA (US); Koh Yamashita, San Jose, CA (US); Madhusudan Nanjanagud, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 52 days.

(21) Appl. No.: 14/029,487

(22) Filed: Sep. 17, 2013

(65) Prior Publication Data
US 2015/0078262 A1  Mar. 19, 2015

(51) Int. Cl.
H04W 72/04 (2009.01)

(52) U.S. Cl.
CPC .................................. *H04W 72/048* (2013.01)

(58) Field of Classification Search
CPC .. H04W 72/0413; H04W 72/093; H04L 2/58; G06K 9/68
See application file for complete search history.

(56) References Cited

U.S. PATENT DOCUMENTS

| | | | | |
|---|---|---|---|---|
| 8,626,156 B2* | 1/2014 | Marsico | ............... | H04W 28/24 455/405 |
| 9,019,819 B2* | 4/2015 | Huber | ............... | G06Q 20/1235 370/229 |
| 9,203,906 B2* | 12/2015 | Wootton et al. | | |
| 9,220,118 B1* | 12/2015 | Ramamurthy et al. | | |
| 2009/0047931 A1* | 2/2009 | Nanda | ............... | H04W 48/02 455/411 |
| 2009/0086672 A1* | 4/2009 | Gholmieh | ............. | H04W 48/14 370/329 |
| 2010/0039956 A1* | 2/2010 | Zheng | ................. | H04L 41/0893 370/252 |
| 2011/0054780 A1* | 3/2011 | Dhanani | ............... | G01C 21/26 701/465 |
| 2011/0188379 A1* | 8/2011 | Calippe | ................... | H04L 41/12 370/241.1 |
| 2011/0188457 A1* | 8/2011 | Shu | ....................... | H04W 28/24 370/329 |
| 2011/0217979 A1* | 9/2011 | Nas | ......................... | H04W 4/00 455/433 |
| 2012/0203906 A1* | 8/2012 | Jaudon | ................... | H04W 76/04 709/225 |
| 2012/0215911 A1* | 8/2012 | Raleigh | ................... | H04L 12/14 709/224 |
| 2012/0231785 A1* | 9/2012 | Poon | ...................... | H04W 24/04 455/423 |
| 2012/0257499 A1* | 10/2012 | Chatterjee et al. | ........... | 370/232 |

(Continued)

*Primary Examiner* — Ricky Ngo
*Assistant Examiner* — Lan Huong Truong
(74) *Attorney, Agent, or Firm* — Patent Capital Group

(57) ABSTRACT

A method is provided in one example and includes determining at least one subscriber session policy, determining at least one current subscriber session analytic data, the current subscriber session analytic data comprising subscriber session analytic data that is indicative of at least one current subscriber session condition, and performing resource allocation based, at least in part, on the subscriber session policy and the current subscriber session analytic data.

20 Claims, 7 Drawing Sheets

(56) References Cited

U.S. PATENT DOCUMENTS

2012/0290732 A1* 11/2012 Suganthi ............ H04L 12/4641
                                                    709/228
2013/0176975 A1*  7/2013 Turanyi et al. ............... 370/329
2013/0246641 A1*  9/2013 Vimpari et al. .............. 709/228
2014/0082169 A1*  3/2014 Shinde et al. ................ 709/223

* cited by examiner

SYSTEM AND METHOD FOR PERFORMING RESOURCE ALLOCATION

TECHNICAL FIELD

This disclosure relates in general to the field of communications and, more particularly, to performing resource allocation.

BACKGROUND

As electronic apparatuses with wireless connectivity become more prevalent, wireless access gateway resources are increasingly being utilized by subscriber sessions associated with inactive and/or disinterested user equipment. Wireless access gateway resources may be wasted on such subscriber sessions such that genuine users attempting to access a wireless local area network are denied access to access point services and/or the wireless local area network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One or more embodiments may provide an apparatus, a computer readable medium, a non-transitory computer readable media, a computer program product, and a method for determining at least one subscriber session policy, determining at least one current subscriber session analytic data, the current subscriber session analytic data comprising subscriber session analytic data that is indicative of at least one current subscriber session condition, and performing resource allocation based, at least in part, on the subscriber session policy and the current subscriber session analytic data.

Example Embodiments

Figure 1:
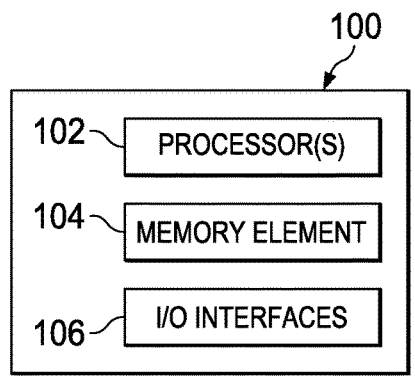
FIG. 1 is a simplified block diagram showing an apparatus according to at least one example embodiment.

FIG. 1 is a simplified block diagram showing an apparatus according to at least one example embodiment. In the example of FIG. 1, electronic apparatus 100 includes processor(s) 102, memory element 104, and input/output (I/O) interface(s) 106. Processor(s) 102 is configured to execute various tasks of electronic apparatus 100 as described herein and memory element 104 is configured to store data associated with electronic apparatus 100. I/O interface(s) 106 is configured to receive communications from and send communications to other devices, user equipment, servers, network elements, nodes, software modules, and/or the like. In one embodiment, electronic apparatus 100 is a node, as further discussed below.

Figure 2:
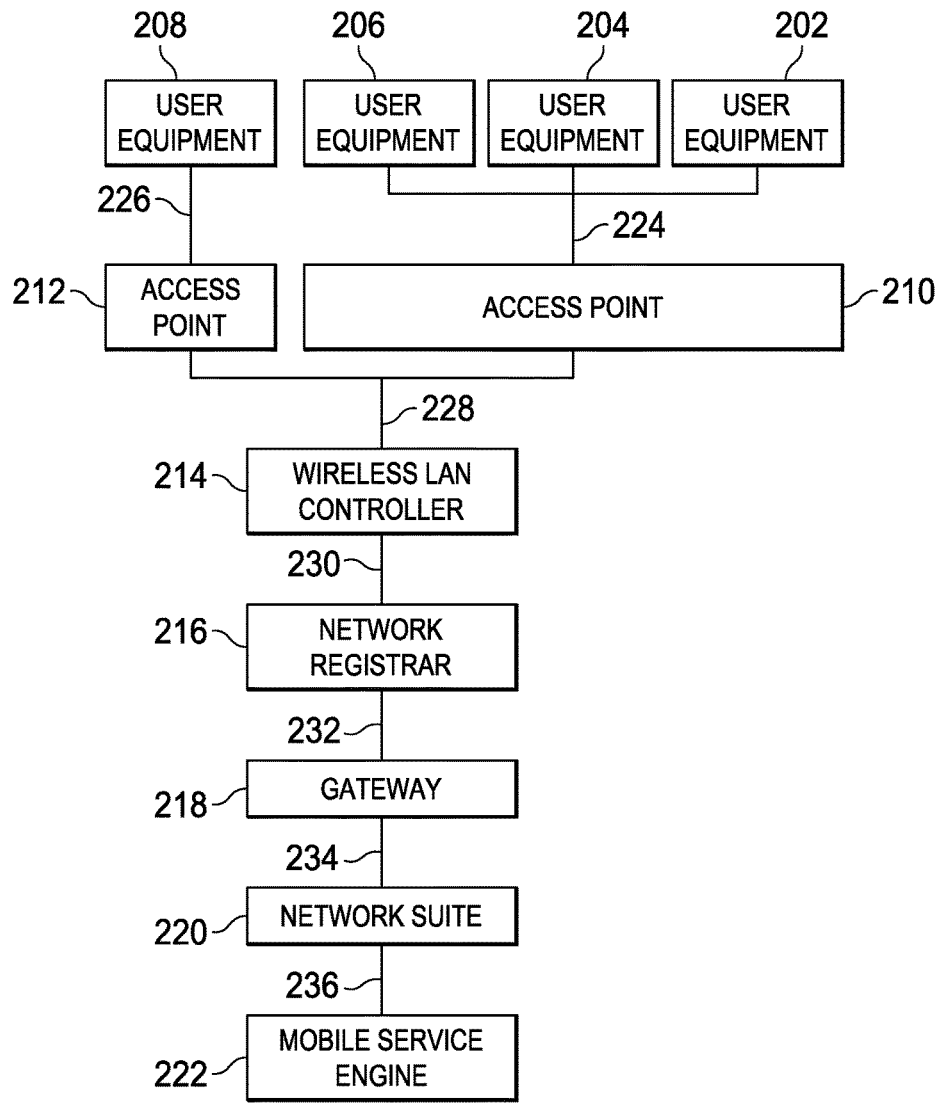
FIG. 2 is a simplified block diagram showing apparatus communication according to at least one example embodiment.

FIG. 2 is a simplified block diagram showing apparatus communication according to at least one example embodiment. The example of FIG. 2 is merely an example and does not limit the scope of the claims. For example, user equipment count may vary, access point count may vary, wireless local area network controller count may vary, communication path may vary, network node placement, order, arrangement, and/or communication channels may vary, and/or the like.

In some circumstances, it may be desirable to manage access points providing for a wireless local area network. For example, in a wireless local area network with an open or broadcasted service set identifier, wireless access gateway resources may be utilized by user equipment belonging to a user that is not actively attempting to access and/or utilize the wireless local area network, termed a walk-by user. In such an example, wireless access gateway resources may be wasted on walk-by users, causing a denial of service to a user wishing to utilize the wireless local area network. An access point may, for example, relate to a wireless network access point, a wireless network gateway, a network gateway, and/or the like. In order to maintain a reliable and accessible wireless local area network, it may be desirable to manage a subscriber session associated with an access point and/or utilization of at least one resource associated with an access point. A subscriber session may, for example, relate to a wireless session between a user equipment and an access point. Further, due to the ever-increasing size, complexity, distribution, and/or coverage of such wireless local area networks, it may be desirable to manage access points in an automated fashion. In at least one example embodiment, management of a subscriber session is based on and/or is in conformance with at least one subscriber session policy. A subscriber session policy may be similar as described regarding FIGS. 5A-5D. For example, at least one subscriber session policy may be determined to be associated with one or more subscriber sessions, access points, and/or the like. The 'subscriber session policy' may include any data, objects, information, rules, parameters, guidelines, frameworks, templates, etc. that may affect a session, a network characteristic, subscriber behavior, resource allocation, session treatment, etc. A subscriber session policy may, for example, be stored in memory, be received from a separate apparatus, and/or the like. Determination of a subscriber session policy may, for example, relate to receiving the subscriber session policy from memory or from a separate apparatus, such as a services gateway, a mobile services engine, and/or the like, and storing the received subscriber session policy in memory or other storage media.

In one or more example embodiments, a subscriber session policy relates to data indicative of at least one rule governing resource allocation of at least one subscriber session. For example, if current wireless local area network conditions and/or circumstances correlate with the rule, the subscriber session policy may cause wireless access gateway resource allocation, reallocation, management, and/or the like. In order to properly enforce a subscriber session policy, it may be desirable to determine current wireless local area network conditions, wireless access gateway resource allocation and/or utilization, subscriber session metrics, and/or the like. In one or more example embodiments, at least one current subscriber session analytic data is determined. The current subscriber session analytic data may, for example, relate to subscriber session analytic data that is indicative of at least one current subscriber session condition. The subscriber session analytic data may, for example, relate to data that is current, real-time, predicted, delayed, at a time proximate to current conditions such that current conditions may be approximated, estimated, and/or inferred, and/or the like. In one or more example embodiments, determination of current subscriber session analytic data relates to receipt of at least one current subscriber session analytic data from memory, receipt of at least one current subscriber session analytic data from a separate apparatus, and/or the like. Receipt of the current subscriber session analytic data from a separate apparatus may, for example, relate to receipt of the current subscriber session analytic data from a service gateway, a mobile service engine, and/or the like. In one or more example embodiments, determination of a current subscriber session analytic data relates to receipt of the current subscriber session analytic data from a separate apparatus and storage of the received current subscriber session analytic data in at least one memory. The subscriber session analytic data may, for example, relate to data indicative of at least one subscriber session condition. The subscriber session analytic data and/or the subscriber session condition may be similar as described regarding FIGS. 5A-5D.

In at least one example embodiment, a subscriber session policy correlates data indicative of at least one subscriber session condition with data indicative of at least one subscriber session directive. In one or more example embodiments, a subscriber session condition relates to a user equipment dwell time, a user equipment location, a time, a subscriber session count, etc. Hence, the term "subscriber session condition" is a broad term that includes any condition, characteristic or parameter associated with session data, subscriber data, network data, location information, timing, etc. The subscriber session directive may, for example, relate to a parameter directive. In one or more example embodiments, performance of resource allocation may be based, at least in part, on a subscriber session policy, a current subscriber session analytic data, and/or the like. The performance of the resource allocation may, for example, relate to causation of setting at least one subscriber session management parameter based, at least in part, on and/or in conformance with the subscriber session policy and the current subscriber session analytic data. For example, if the subscriber session policy correlates a specific time condition with heightened wireless access gateway resource utilization, the subscriber session policy and/or subscriber session directive may be associated with performance of resource allocation via a setting of a shorter subscriber session timeout, a shorter subscriber session keep-alive timer, a reduction in a quality of service, an enforcement of an address whitelist and/or an address blacklist, and/or the like. In at least one example embodiment, causation of setting of a subscriber session management parameter relates to sending of data indicative of the subscriber session management parameter to a separate apparatus. The subscriber session condition, the subscriber session directive, and the parameter directive may be similar as described regarding FIGS. 5A-5D.

In some circumstances, it may be desirable for wireless access gateway resource allocation to be based, at least in part, on subscriber session analytic data aggregated, collected, averaged, modeled, and/or accumulated over some period of time. For example, it may be desirable to base a subscriber session policy on historical wireless local area network resource utilization data. Such historical data, accumulated data, modeled data, and/or the like may relate to multi-temporal subscriber session analytic data, similar as described regarding FIGS. 5A-5D. In at least one example embodiment, multi-temporal subscriber session analytic data may be received from memory, received from a separate apparatus, and/or the like. Determination of a subscriber session policy may, for example, be based, at least in part, on the received multi-temporal subscriber session analytic data. In such circumstances, it may be desirable to update a multi-temporal subscriber session analytic data on a continual or rolling basis in order to grow and/or develop a larger subscriber session analytic data set. For example, based, at least in part, on a current subscriber session analytic data and the multi-temporal subscriber session analytic data, a changed multi-temporal subscriber session analytic data may be determined and subsequently stored in at least one memory. The change to the multi-temporal subscriber session analytic data may relate to an addition of subscriber session analytic data points to a data set that comprises the multi-temporal subscriber session analytic data, a re-averaging of data that comprises the multi-temporal subscriber session analytic data, an update to a data model associated with the multi-temporal subscriber session analytic data, and/or the like. In at least one example embodiment, a subscriber session policy is caused to be modified based, at least in part, on a multi-temporal subscriber session analytic data and the subsequently stored in at least one memory. For example, in order to account for changed multi-temporal subscriber session analytic data, the subscriber session policy may be modified to account for the new multi-temporal subscriber session analytic data and the modified subscriber session policy stored in memory for current and/or future enforcement.

FIG. 2 is a simplified block diagram showing apparatus communication according to at least one example embodiment. In the example of FIG. 2, user equipment 202, user equipment 204, and user equipment 206 are in communication with access point 210 via communication channel 224 and user equipment 208 is in communication with access point 212 via communication channel 226. User equipment 202, user equipment 204, user equipment 206, and/or user equipment 208 may, for example, relate to a phone, a tablet, a laptop, a computer, a music player, a gaming machine, an electronic apparatus having wireless connectivity capability, and/or the like. Moreover, the term 'user equipment' is interchangeable with the term 'subscriber' and, further, both terms are inclusive of any devices used to initiate a communication, such as any type of receiver, a computer, a set-top box, an Internet radio device (IRD), a cell phone, a smartphone, a laptop, a tablet, a personal digital assistant (PDA), a Google Android™, an iPhone™, an iPad™, a Microsoft Surface™, or any other device, component, element, endpoint, or object capable of initiating voice, audio, video, media, or data exchanges within a communication system. This includes any device that seeks to initiate a communication on behalf of another entity or element, such as a program, a database, or any other component, device, element, or object capable of initiating an exchange within the communication system. Data, as used herein in this document, refers to any type of numeric, voice, video, media, audio, or script data, or any type of source or object code, or any other suitable information in any appropriate format that may be communicated from one point to another.

Access point 210 and/or access point 212 relate to a wireless access point, a wireless router, and/or the like. Communication channel 224 and/or communication channel 226 relate to a wireless communication channel, cellular communication channel, 802.11a/b/g/n/ac/ad wireless protocol communication channel, and/or the like. In the example of FIG. 2, access point 210 and access point 212 are in communication with wireless local area network controller 214 via communication channel 228. Communication channel 228 may relate to a wireless local area network communication channel, a local area network communication channel, a wide-area network, and/or the like. In the example of FIG. 2, wireless local area network controller 214 is in communication with network registrar 216 via communication channel 230. Network registrar 216 may relate to a domain name system, an internet protocol address management system, and/or the like. Communication channel 230 may relate to a wireless local area network communication channel, a local area network communication channel, a wide-area network, and/or the like. In the example of FIG. 2, network registrar 216 is in communication with gateway 218 via communication channel 232. Gateway 218 may relate to an intelligent service gateway, a service gateway, an intermediary server, a service platform, and/or the like. Communication channel 232 may relate to a wireless local area network communication channel, a local area network communication channel, a wide-area network, and/or the like. In the example of FIG. 2, gateway 218 is in communication with network suite 220 via communication channel 234. Network suite 220 may relate to a network management suite, a network management server, a software suite, an authentication, authorization and accounting server, an authentication, authorization and accounting software suite, and/or the like. Communication channel 234 may relate to a wireless local area network communication channel, a local area network communication channel, a wide-area network, and/or the like. In the example of FIG. 2, network suite 220 is in communication with mobile service engine 222 via communication channel 236. Mobile service engine 222 may relate to a mobile service suite, a mobile service server, a software suite, a mobility services engine, a network services platform, a location-based services platform, and/or the like. Communication channel 236 may relate to a wireless local area network communication channel, a local area network communication channel, a wide-area network, and/or the like. Note that any of these items (e.g., gateway 218, network suite 220, mobile service engine 222, WLAN controller 214, access points 212 or 224, and network registrar 216) may be consolidated together, or combined in any suitable manner. Their illustration in FIG. 2 is merely for discussion purposes.

Figure 3:
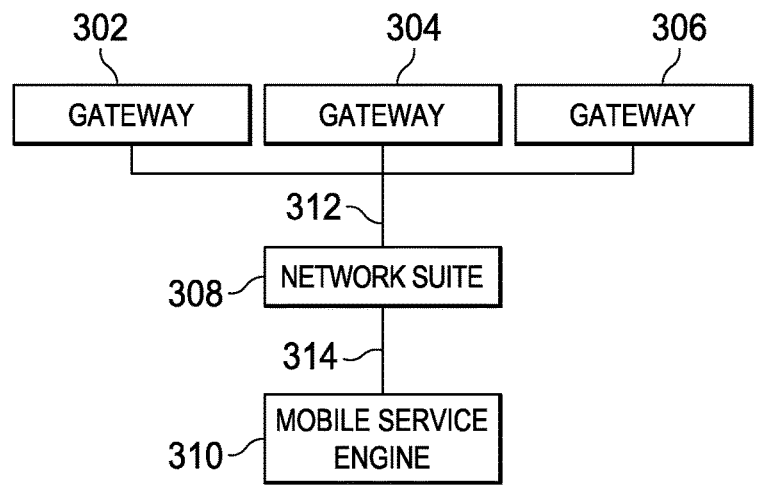
FIG. 3 is a simplified block diagram showing apparatus communication according to at least one example embodiment.

FIG. 3 is a simplified block diagram showing apparatus communication according to at least one example embodiment. The example of FIG. 3 is merely an example and does not limit the scope of the claims. For example, gateway count may vary, network suite count may vary, mobile service engine count may vary, communication path may vary, intermediary placement, arrangement, and/or communication channels may vary, and/or the like.

In some circumstances, it may be desirable to associate more than one service gateway with a wireless network management platform. For example, in a large scale, distributed wireless local area network, a plurality of access points may be associated with a smaller plurality of wireless local area network controllers and service gateways. If consistent service gateway management and administration is desirable, the plurality of gateways may be associated with a common wireless network management platform. In such an example, the wireless network management platform may relate to a network management suite, a network service gateway, a location-based service engine, and/or the like. The centralized management of multiple gateways and associated wireless local area network controllers and access points allows for distributed collection of subscriber session analytic data, determination of multi-temporal subscriber session analytic data, and application of subscriber session policy across a distributed wireless local area network.

FIG. 3 is a simplified block diagram showing apparatus communication according to at least one example embodiment. In the example of FIG. 3, gateway 302, gateway 304, and gateway 306 are in communication with network suite 308 via communication channel 312, similar as may be described regarding FIG. 2. Network suite 308 is in communication with mobile service engine 310, similar as may be described regarding FIG. 2. In the example of FIG. 3, additional intermediate network nodes may exist along communication channel 312 and/or communication channel 314. Note that any of these items (e.g., gateway 306, network suite 308, and mobile service engine 310) may be consolidated together, or combined in any suitable manner. Their illustration in FIG. 3 is merely for discussion purposes.

Figure 4:
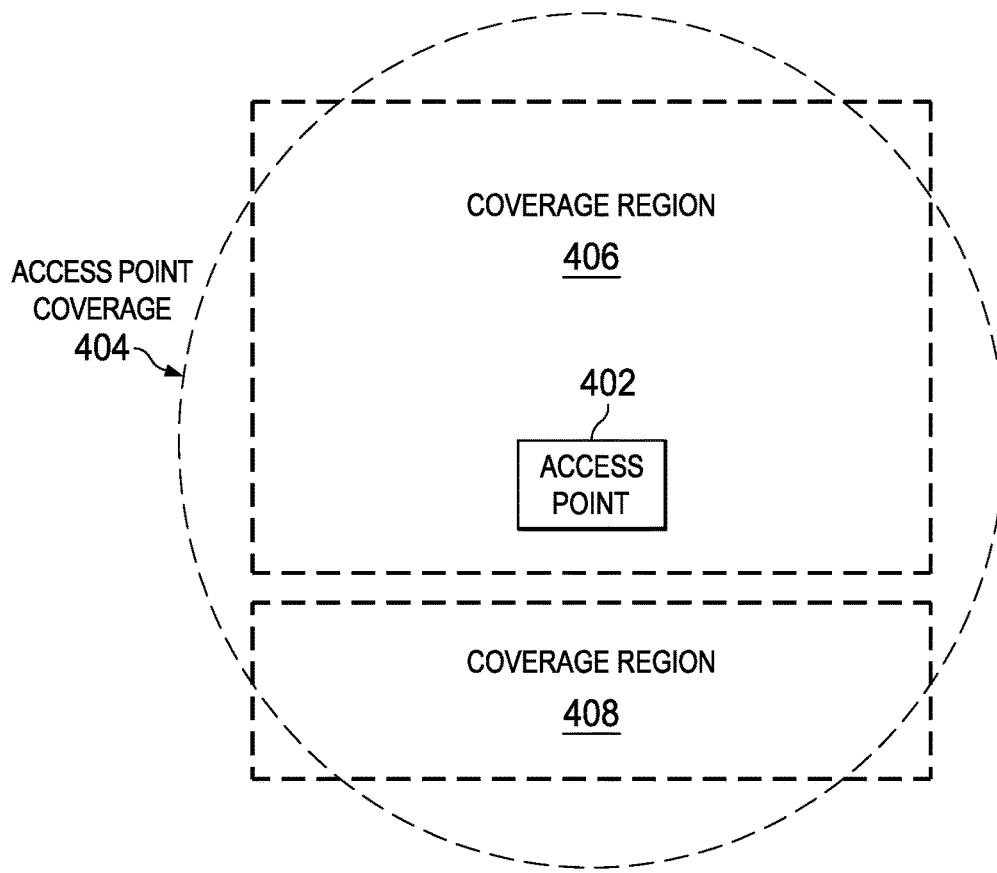
FIG. 4 is a simplified illustration showing coverage regions according to at least one example embodiment.

FIG. 4 is a simplified illustration showing coverage regions according to at least one example embodiment. The example of FIG. 4 is merely an example and does not limit the scope of the claims. For example, access point count, location, and/or size may vary, access point coverage region count, size, shape, and/or location may vary, coverage region count, size, shape, and/or location may vary, and/or the like.

In some circumstances, it may be desirable to differentiate between different regions of an access point coverage region. For example, it may be desirable to limit access to a wireless local area network to user equipment located within a predetermined region, such as the interior of a store, while precluding, avoiding, and/or disfavoring access to the wireless local area network from user equipment located outside of the predetermined region and/or in a different region. In at least one example embodiment, management of wireless access gateway resource allocation may be based, at least in part, on subscriber session location data. In such an example, a subscriber session policy may cause allocation of wireless access gateway resources, setting of subscriber session management parameters, and/or the like, based, at least in part on, the subscriber session location data. Such subscriber session location data may relate to global positioning system location data, triangulation location data, and/or the like, and may be similar as described regarding FIGS. 5A-5D.

FIG. 4 is a simplified illustration showing coverage regions according to at least one example embodiment. In the example of FIG. 4, access point 402 is associated with access point coverage 404. Access point 402 relates to a wireless access point, a wireless router, and/or the like. Access point coverage 404 relates to a service coverage region associated with access point 402. In the example of FIG. 4, access point coverage 404 includes at least part of coverage region 406 and coverage region 408. Coverage region 406 may, for example, relate to a favored region, such as the interior of a store, a coffee shop, an internet café, a restaurant, and/or the like. Coverage region 408 may, for example, relate to a less favored region, such as a sidewalk, a shopping mall corridor, a street, a light rail track, and/or the like. In the example of FIG. 4, subscriber sessions originating from within coverage region 406 may receive preferential allocation of wireless access gateway resources based, at least in part, on a subscriber session policy that correlates subscriber session location within coverage region 406 with a rule directing such preferential allocation of wireless access gateway resources. In the example of FIG. 4, subscriber sessions originating from within coverage region 408 may receive standard and/or restricted allocation of wireless access gateway resources based, at least in part, on a subscriber session policy that correlates subscriber session location within coverage region 408 with a rule directing such standard and/or restricted allocation of wireless access gateway resources.

FIGS. 5A-5D are simplified block diagrams showing data schema according to at least one example embodiment. The example of FIGS. 5A-5D are merely examples and do not limit the scope of the claims. For example, subscriber session analytic data type, category, count, and/or the like may vary, data schema may vary, policy schema may vary, directive count, type, category, and/or the like may vary, parameter type, category, count, and/or the like may vary, and/or the like.

In some circumstances, it may be desirable to allocate wireless access gateway resources based, at least in part, on current subscriber session analytic data. For example, if the current subscriber session analytic data correlates with a subscriber session condition of a subscriber session policy, wireless access gateway resources will be allocated and/or managed in compliance with a parameter directive associated with said correspondence. In a congested wireless environment, it may be desirable to allocate wireless access gateway resources based on specific subscriber session characteristics that provide insight into wireless local area network conditions and user intentions. In at least one example embodiment, a subscriber session analytic data may, for example, relate to a user equipment dwell time, a user equipment location, a time, a subscriber session count, and/or the like. Similarly, since it may be desirable for subscriber session analytic data and subscriber session conditions to be similarly organized, a subscriber session condition may relate to a user equipment dwell time, a user equipment location, a time, a subscriber session count, and/or the like. The user equipment dwell time may relate to a duration of a subscriber session, a duration of a user equipment proximity to an access point, an average duration of a subscriber session, an average duration of user equipment proximity to an access point, and/or the like. The user equipment location may relate to a geographical location associated with the subscriber session, a geographical location of the user equipment, and/or the like. The time may relate to a time of day, a day, a date, a season, and/or the like. The subscriber session count may relate to a number of subscriber sessions, a number of proximate user equipment, and/or the like. In at least one example embodiment, a parameter directive associated with a subscriber session condition relates to a setting for at least one subscriber session management parameter.

The subscriber session management parameter may, for example, relate to an un-authorization timer parameter, a session timeout parameter, a keep-alive timer parameter, a quality of service parameter, a blacklist parameter, a whitelist parameter, a redirect parameter, or an anchor parameter. The un-authorization timer parameter may relate to a time limit, after which an associated subscriber session is unauthorized and/or terminated in order to reallocate wireless access gateway resources. The session timeout parameter may, for example, relate to an inactivity timeout period, after which an associated subscriber session is unauthorized and/or terminated in order to reallocate wireless access gateway resources. The keep-alive timer parameter may, for example, relate to a timer after which an access point can terminate an associated subscriber session due to timeout. The quality of service parameter may, for example, relate to bandwidth allocation, traffic priority, channel selection, and/or the like. The blacklist parameter may, for example, relate to a predetermined list of restricted websites. For example, during periods of high wireless access gateway resource utilization, the blacklist parameter may restrict access to one or more websites on the blacklist, causes redirection from the blacklisted website, and/or the like, in order to free up wireless access gateway resources for higher priority traffic. Similarly, the whitelist parameter may, for example, relate to a predetermined set of allowed websites. For example, during periods of high wireless access gateway resource utilization, the whitelist parameter may allow access only to one or more websites on the whitelist in order to restrict access to non-whitelisted websites and to free up wireless access gateway resources. In at least one example embodiment, a whitelist parameter and/or a blacklist parameter may be based, at least in part, on subscriber session analytic data. For example, a whitelist parameter and/or a blacklist parameter may be based, at least in part, on subscriber session location data. In such an example, subscriber session location data indicating that an associated user equipment is located in a specific store may result in whitelisting the specific store website and/or blacklisting other predetermined websites. In at least one example embodiment, a blacklist parameter may be based, at least in part, on subscriber session analytic data and/or multi-temporal subscriber session analytic data such that a non-whitelisted website utilizing a substantial amount of wireless access gateway resources may be blacklisted in order to reallocate said wireless access gateway resources. The anchor parameter may, for example, relate to a mobility anchor. In at least one example embodiment, a mobility anchor parameter relates to a parameter associated with dynamically spreading access point load across multiple access points, across a mobility group, and/or the like. In at least one example embodiment, a mobility anchor relates to quest tunneling, auto anchor mobility, and/or the like. A mobility anchor may, for example, relate to a feature that allows client traffic belonging to a wireless local area connection to be tunneled to a predefined access point and/or wireless local area network controller, a predefined set of access points and/or controllers, and/or the like that are configured as mobility anchors for that specific wireless local area network.

Figure 5A:
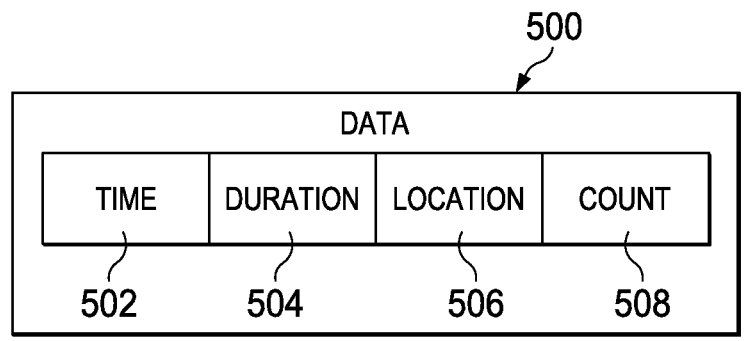
FIGS. 5A-D are simplified block diagrams showing data schema according to at least one example embodiment.

FIG. 5A is a simplified block diagram showing data schema according to at least one example embodiment. In the example of FIG. 5A, data 500 comprises time data 502, duration data 504, location data 506, and count data 508. Data 500 relates to a subscriber session analytic data, a subscriber session condition, and/or the like. In the example of FIG. 5A, time data 502 relates to a time of day, a day, a date, a season, and/or the like. Duration data 504 relates to a user equipment dwell time, a subscriber session duration, an average subscriber session duration, and/or the like. Location data 506 relates to a geographical location of a user equipment, a geographical location associated with a subscriber session, and/or the like. Count data 508 relates to a subscriber session count, a number of subscriber sessions, and/or the like.

Figure 5B:
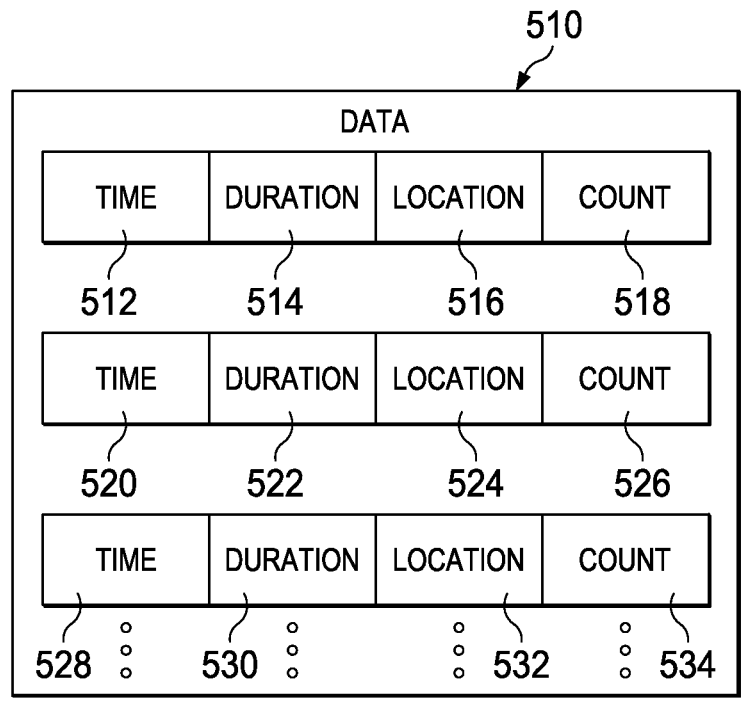

FIG. 5B is a simplified block diagram showing data schema according to at least one example embodiment. In the example of FIG. 5B, data 510 relates to multi-temporal subscriber session analytic data. In the example of FIG. 5B, each set of time data, duration data, location data, and count data comprises a subscriber session analytic data. For example, one subscriber session analytic data comprises time data 512, duration data 514, location data 506, and count data 518. Another subscriber session analytic data comprises time data 520, duration data 522, location data 524, and count data 526. Together, the plurality of subscriber session analytic data sets comprises the multi-temporal subscriber session analytic data. In the example of FIG. 5B, each subscriber session analytic data set may not be a discrete data set but may instead be integrated into a data average, a data model, and/or the like that is indicative of the multi-temporal subscriber session analytic data. In the example of FIG. 5B, data 510 may be associated with subscriber session analytic data in addition to the subscriber session analytic data shown.

Figure 5C:
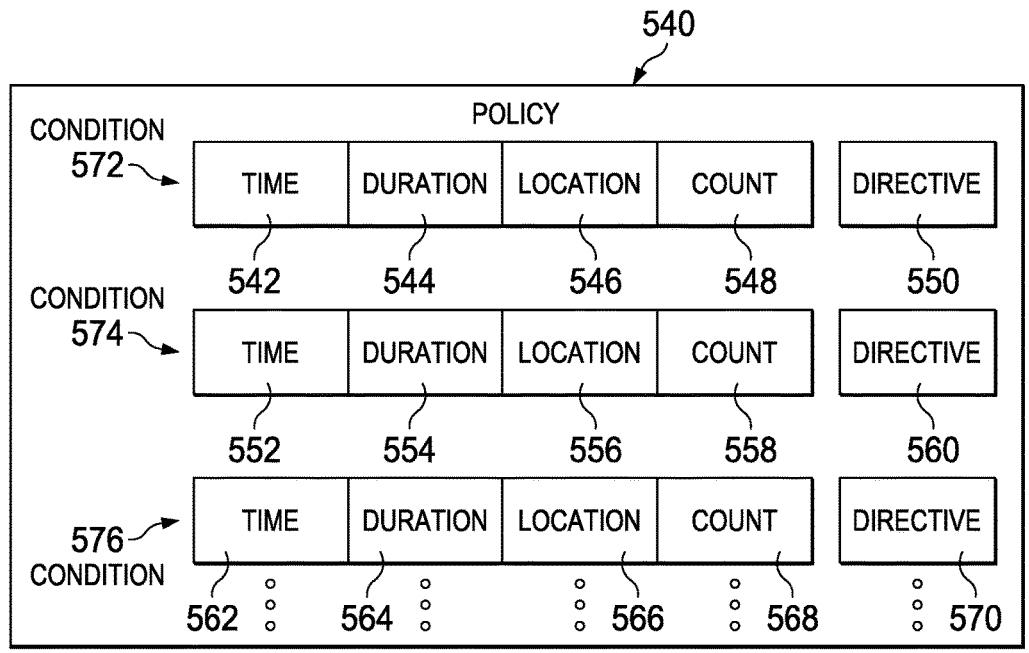

FIG. 5C is a simplified block diagram showing data schema according to at least one example embodiment. In the example of FIG. 5C, policy 540 relates to a subscriber session policy. Policy 540 comprises condition 572, condition 574, and condition 576. In the example of FIG. 5C, condition 572 is associated with directive 550, condition 574 is associated with directive 560, and condition 576 is associated with directive 570. In the example of FIG. 5C, each condition may be associated with time data, duration data, location data, and/or count data. For example, condition 572 may be associated with time data 542, duration data 544, location data 546, and/or count data 548. Policy 540 may comprise conditions and associated directives in addition to the conditions and directives shown. In the example of FIG. 5C, satisfaction of a condition results in implementation and/or performance of the associated directive. For example, at a time associated with time data 552, if current subscriber session analytic data correlates with duration data 554, location data 556, and/or count data 558 of condition 574, direct 560 may be performed as a result.

Figure 5D:
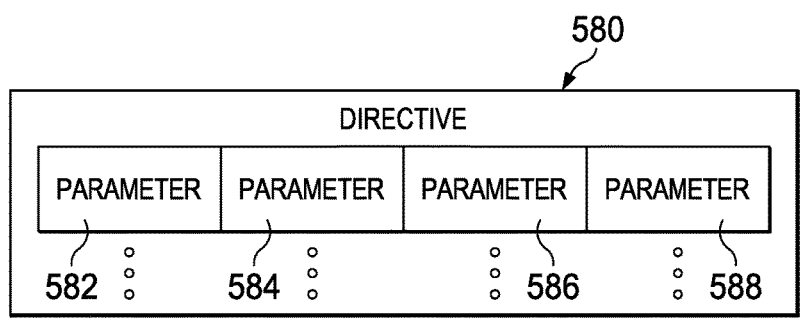

FIG. 5D is a simplified block diagram showing data schema according to at least one example embodiment. In the example of FIG. 5D, directive 580 relates to a rule governing resource allocation, a subscriber session directive, a parameter directive, and/or the like. In the example of FIG. 5D, directive 580 comprises parameter 582, parameter 584, parameter 586, and parameter 588. Each of parameter 582, parameter 584, parameter 586, and parameter 588 may relate to a subscriber session management parameter, an un-authorization timer parameter, a session timeout parameter, a keep-alive timer parameter, a quality of service parameter, a blacklist parameter, a whitelist parameter, a redirect parameter, or an anchor parameter, and/or the like. Directive 580 may comprise more or less parameters than shown in the example of FIG. 5D. In the example of FIG. 5D, performance of direction 580 results in the setting of subscriber session management parameters associated with parameter 582, parameter 584, parameter 586, and parameter 588.

Figure 6:
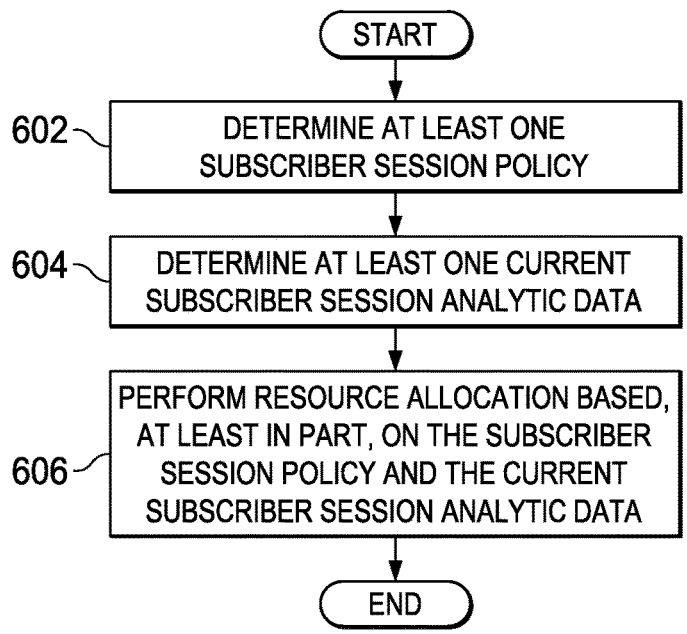
FIG. 6 is a simplified flowchart showing activities associated with performing resource allocation according to at least one example embodiment.

FIG. 6 is a simplified flowchart showing activities associated with performing resource allocation according to at least one example embodiment. Note that the term 'resource allocation' as used herein is a broad term that includes any type of network resource, computer resource, link resource, memory resource, bandwidth resource, etc. In at least one example embodiment, there is a set of operations that corresponds with the activities of FIG. 6. An apparatus, for example electronic apparatus 100 of FIG. 1, or a portion thereof, may utilize the set of operations. The electronic apparatus may comprise means, including, for example processor(s) 102 of FIG. 1, for performance of such operations. In an example embodiment, an apparatus, for example, electronic apparatus 100 of FIG. 1, is transformed by having memory, for example, memory element 104 of FIG. 1, comprising computer code configured to, working with a processor, for example, processor(s) 102 of FIG. 1, cause the apparatus to perform set of operations of FIG. 6.

At block 602, the apparatus determines at least one subscriber session policy, similar as may be described regarding FIG. 2 and FIGS. 5A-5D. At block 604, the apparatus determines at least one current subscriber session analytic data, similar as may be described regarding FIG. 2 and FIGS. 5A-5D. Note that the broad term "subscriber session analytic data" is meant to encompass any of the items discussed herein, along with any other type of session data, subscriber data, network data, computer data, bandwidth data, link data, etc. At block 606, the apparatus performs resource allocation based, at least in part, on the subscriber session policy and the current subscriber session analytic data, similar as may be described regarding FIG. 2 and FIGS. 5A-5D.

Figure 7:
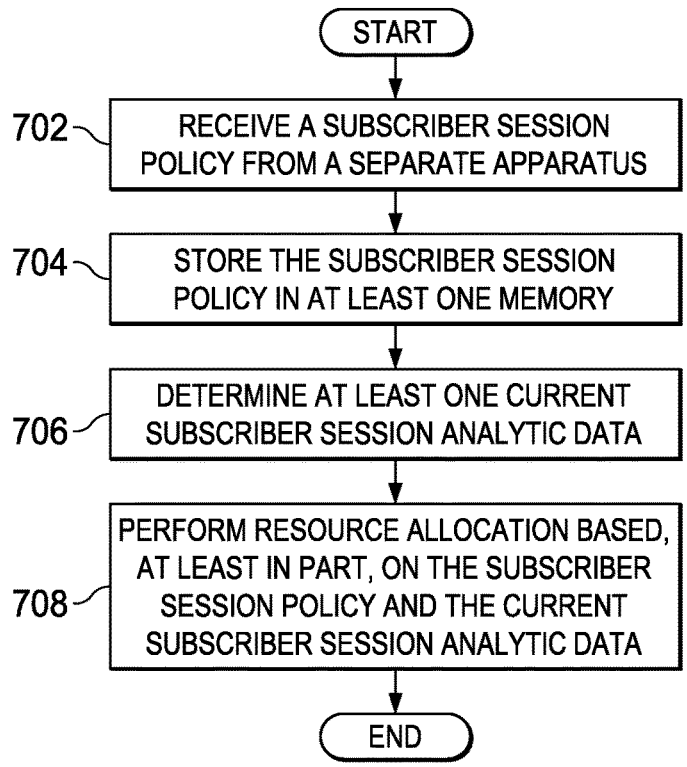
FIG. 7 is a simplified flowchart showing activities associated with performing resource allocation according to at least one example embodiment.

FIG. 7 is a simplified flowchart showing activities associated with performing resource allocation according to at least one example embodiment. In at least one example embodiment, there is a set of operations that corresponds with the activities of FIG. 7. An apparatus, for example electronic apparatus 100 of FIG. 1, or a portion thereof, may utilize the set of operations. The electronic apparatus may comprise means, including, for example processor(s) 102 of FIG. 1, for performance of such operations. In an example embodiment, an apparatus, for example, electronic apparatus 100 of FIG. 1, is transformed by having memory, for example, memory element 104 of FIG. 1, comprising computer code configured to, working with a processor, for example, processor(s) 102 of FIG. 1, cause the apparatus to perform set of operations of FIG. 7.

At block 702, the apparatus receives a subscriber session policy from a separate apparatus, similar as may be described regarding FIG. 2 and FIGS. 5A-5D. At block 704, the apparatus stores the subscriber session policy in at least one memory, similar as may be described regarding FIG. 2 and FIGS. 5A-5D. At block 706, the apparatus determines at least one current subscriber session analytic data, similar as may be described regarding block 604 of FIG. 6. At block 708, the apparatus performs resource allocation based, at least in part, on the subscriber session policy and the current subscriber session analytic data, similar as may be described regarding block 606 of FIG. 6.

Figure 8:
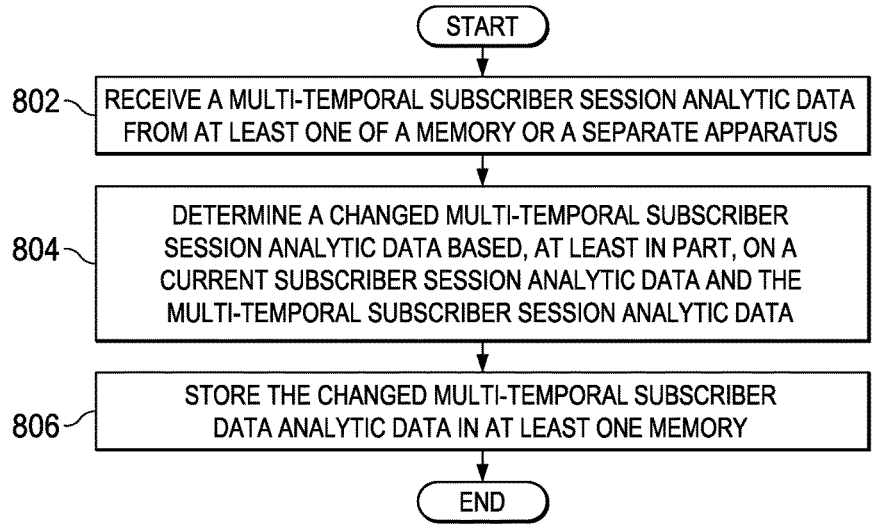
FIG. 8 is a simplified flowchart showing activities associated with performing resource allocation according to at least one example embodiment.

FIG. 8 is a simplified flowchart showing activities associated with performing resource allocation according to at least one example embodiment. In at least one example embodiment, there is a set of operations that corresponds with the activities of FIG. 8. An apparatus, for example electronic apparatus 100 of FIG. 1, or a portion thereof, may utilize the set of operations. The electronic apparatus may comprise means, including, for example processor(s) 102 of FIG. 1, for performance of such operations. In an example embodiment, an apparatus, for example, electronic apparatus 100 of FIG. 1, is transformed by having memory, for example, memory element 104 of FIG. 1, comprising computer code configured to, working with a processor, for example, processor(s) 102 of FIG. 1, cause the apparatus to perform set of operations of FIG. 8.

At block 802, the apparatus receives a multi-temporal subscriber session analytic data from at least one of a memory or a separate apparatus, similar as may be described regarding FIG. 2 and FIGS. 5A-5D. At block 804, the apparatus determines a changed multi-temporal subscriber session analytic data based, at least in part, on a current subscriber session analytic data and the multi-temporal subscriber session analytic data, similar as may be described regarding FIG. 2 and FIGS. 5A-5D. At block 806, the apparatus stores the changed multi-temporal subscriber session analytic data in at least one memory, similar as may be described regarding FIG. 2 and FIGS. 5A-5D.

Figure 9:
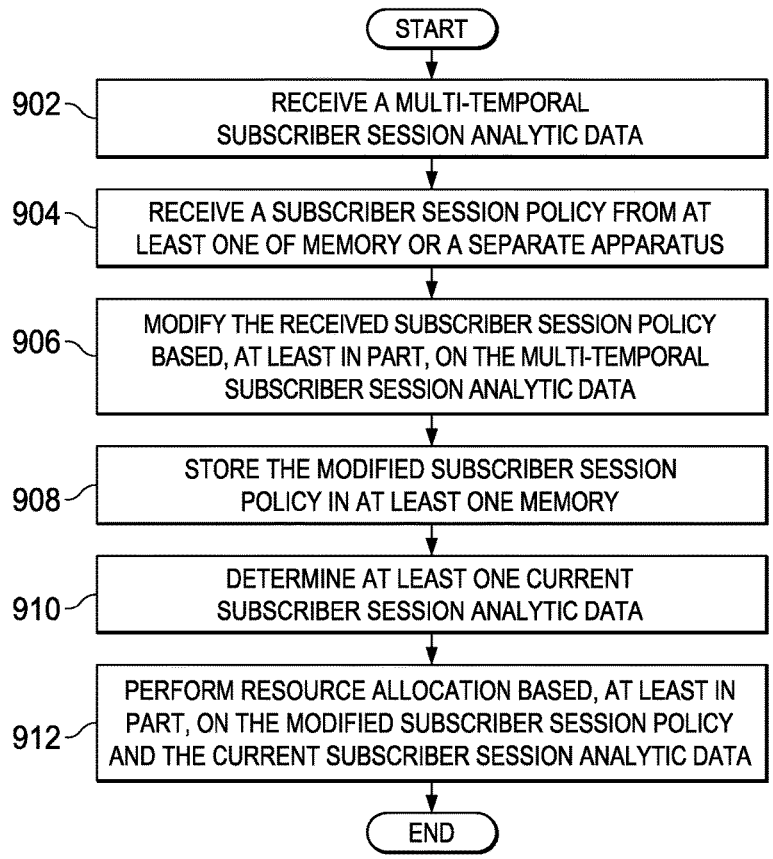
FIG. 9 is a simplified flowchart showing activities associated with performing resource allocation according to at least one example embodiment.

FIG. 9 is a simplified flowchart showing activities associated with performing resource allocation according to at least one example embodiment. In at least one example embodiment, there is a set of operations that corresponds with the activities of FIG. 9. An apparatus, for example electronic apparatus 100 of FIG. 1, or a portion thereof, may utilize the set of operations. The electronic apparatus may comprise means, including, for example processor(s) 102 of FIG. 1, for performance of such operations. In an example embodiment, an apparatus, for example, electronic apparatus 100 of FIG. 1, is transformed by having memory, for example, memory element 104 of FIG. 1, comprising computer code configured to, working with a processor, for example, processor(s) 102 of FIG. 1, cause the apparatus to perform set of operations of FIG. 9.

At block 902, the apparatus receives a multi-temporal subscriber session analytic data, similar as may be described regarding block 802 of FIG. 8. At block 904, the apparatus receives a subscriber session policy from at least one of a memory or a separate apparatus, similar as may be described regarding FIG. 2 and FIGS. 5A-5D. At block 906, the apparatus modifies the received subscriber session policy based, at least in part, on the multi-temporal subscriber session analytic data, similar as may be described regarding FIG. 2 and FIGS. 5A-5D. At block 908, the apparatus stores the modified subscriber session policy in at least one memory, similar as may be described regarding FIG. 2 and FIGS. 5A-5D. At block 910, the apparatus determines at least one current subscriber session analytic data, similar as may be described regarding block 606 of FIG. 6. At block 912, the apparatus performs resource allocation based, at least in part, on the modified subscriber session policy and the current subscriber session analytic data, similar as may be described regarding FIG. 2 and FIGS. 5A-5D.

Figure 10:
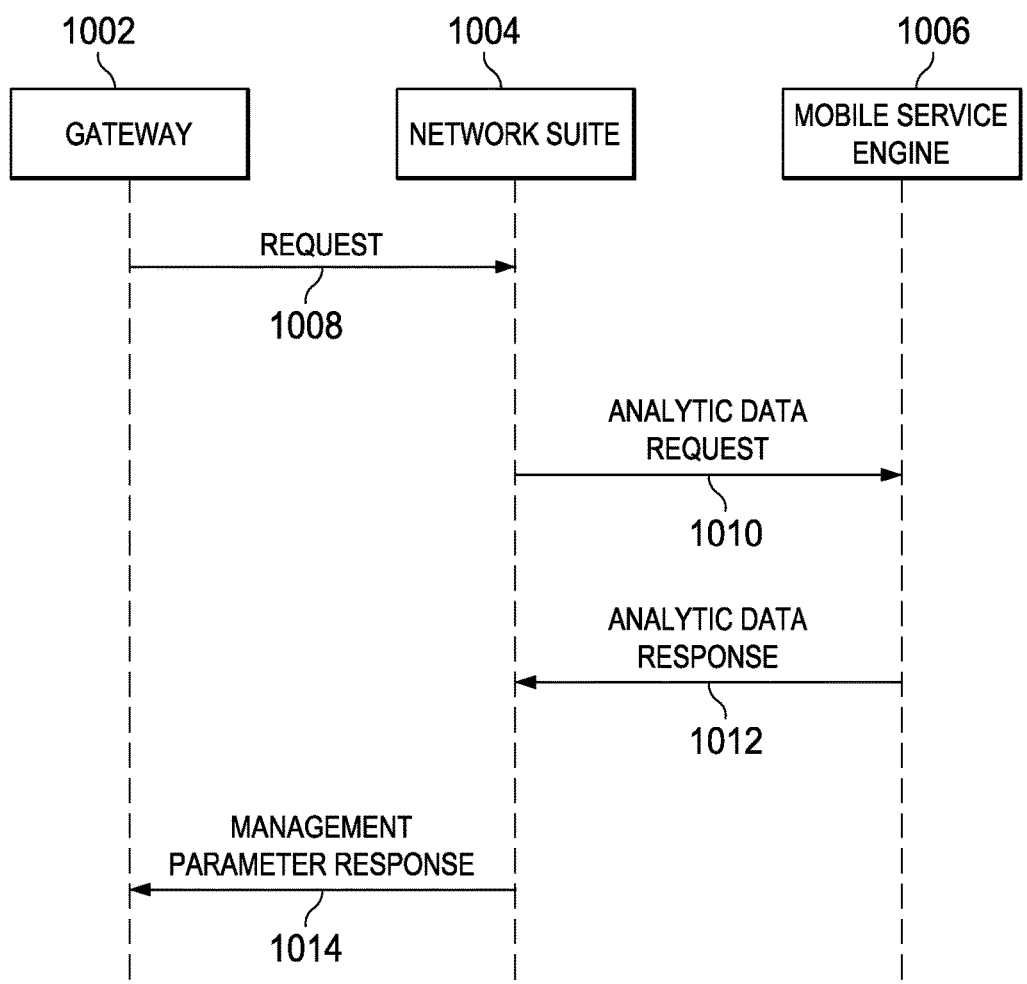
FIG. 10 is a simplified interaction diagram showing activities associated with performing resource allocation according to at least one example embodiment.

FIG. 10 is a simplified interaction diagram showing activities associated with performing resource allocation according to at least one example embodiment. In at least one example embodiment, there is a set of operations that corresponds with, at least some of, the activities of FIG. 10. For example, there may be a set of operations associated with activities of one or more apparatuses of FIG. 10. An apparatus, for example electronic apparatus 100 of FIG. 1, or a portion thereof, may utilize the set of operations. The access point may comprise means, including, for example processor(s) 102 of FIG. 1, for performance of such operations. In an example embodiment, an apparatus, for example electronic apparatus 100 of FIG. 1, is transformed by having memory, for example memory element 104 of FIG. 1, comprising computer code configured to, working with a processor, for example processor(s) 102 of FIG. 1, cause the apparatus to perform set of operations of FIG. 10.

FIG. 10 is a simplified interaction diagram showing activities associated with performing resource allocation according to at least one example embodiment. In the example of FIG. 10, gateway 1002 relates to an intelligent service gateway, a service gateway, an intermediary server, a service platform, and/or the like. Network suite 1004 relates to a network management suite, a network management server, a software suite, an authentication, authorization and accounting server, an authentication, authorization and accounting software suite, and/or the like. Mobile service engine 1006 relates to a mobile service suite, a mobile service server, a software suite, a mobility services engine, a network services platform, a location-based services platform, and/or the like.

At interaction 1008, gateway 1002 sends a request to network suite 1004. In the example of FIG. 10, request 1008 relates to an authentication request, an authorization request, a join request, a session initiation request, session management request, data request, and/or the like, similar as may be described regarding FIG. 2. At interaction 1010, network suite 1004 sends an analytic data request to mobile service engine 1006. In the example of FIG. 10, analytic data request 1010 relates to a subscriber session analytic data request, a current subscriber session analytic data request, a subscriber session policy request, and/or the like, similar as may be described regarding FIG. 2 and FIG. 5A-5D.

At interaction 1012, mobile service engine 1006 sends an analytic data response to network suite 1004. In the example of FIG. 10, analytic data response 1012 relates to a subscriber session analytic data response, a current subscriber session analytic data response, a subscriber session policy response, and/or the like, similar as may be described regarding FIG. 2 and FIG. 5A-5D. At interaction 1014, network suite 1004 sends a management parameter response to gateway 1002. In the example of FIG. 10, management parameter response 1014 relates to a subscriber session analytic data response, a current subscriber session analytic data response, a subscriber session policy response, a subscriber session directive response, a parameter directive response, a subscriber session management parameter response, and/or the like, similar as may be described regarding FIG. 2 and FIG. 5A-5D.

As used herein, the access points, gateways, wireless local area network controllers, network suites, mobile service engines, and/or the like are nodes that can facilitate the network communication activities discussed herein. As used herein in this Specification, the term 'node' is meant to encompass any of the aforementioned items, along with routers, switches, controllers, cable boxes, gateways, access points, bridges, load balancers, access concentrators, firewalls, inline service nodes, proxies, servers, processors, modules, or any other suitable device, component, element, proprietary appliance, or object operable to exchange information in a network environment. These nodes may include any suitable hardware, software, components, modules, interfaces, or objects that facilitate the operations thereof. This may be inclusive of appropriate algorithms, communication protocols, and interfaces that allow for the effective exchange of data or information.

In one implementation, one or more of the nodes include software to achieve (or to foster) the network communication activities discussed herein. This could include, for example, the implementation of instances of software modules (where these modules interact, perform reciprocating functions, and/or suitably coordinate their activities with peers). Additionally, each of these elements can have an internal structure (e.g., a processor, a memory element, etc.) to facilitate some of the operations described herein. In other embodiments, these network communication activities may be executed externally to these elements, or included in some other network element to achieve the intended functionality. Alternatively, one or more of the nodes may include software (or reciprocating software) that can coordinate with other network elements in order to achieve the network communication activities described herein. In still other embodiments, one or several devices may include any suitable algorithms, hardware, software, components, modules, interfaces, or objects that facilitate the operations thereof.

Note that in certain example implementations, the functions outlined herein associated with network interactions may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory [as shown in FIG. 1] can store data used for the operations described herein. This includes the memory being able to store instructions (e.g., software, logic, processor instructions, etc.) that can be executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/ computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Furthermore, various memory items (e.g., databases, tables, queues, buffers, caches, trees, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the present disclosure (and its teachings) are readily scalable and can accommodate a large number of components, as well as more complicated/sophisticated arrangements and configurations. Accordingly, the examples provided should not limit the scope or inhibit the broad teachings of the present disclosure as potentially applied to a myriad of other architectures.

It is important to note that the steps in the preceding flow diagrams illustrate only some of the possible signaling scenarios and patterns that may be executed by, or within, electronic apparatus 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. If desired, the different functions discussed herein may be performed in a different order and/or concurrently with each other. For example, block 904 of FIG. 9 may be performed before block 902 of FIG. 9. Furthermore, if desired, one or more of the above-described functions may be optional or may be combined. For example, block 702 of FIG. 7 may be optional and/or combined with block 704 of FIG. 7. The preceding operational flows have been offered for purposes of example and discussion. Substantial flexibility is provided by electronic apparatus 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although electronic apparatus 100 has been illustrated with reference to particular elements and operations that facilitate the communication process, these elements and operations may be replaced by any suitable architecture or process that achieves the intended functionality of electronic apparatus 100. Although various aspects of the disclosure are set out in the independent claims, other aspects of the disclosure comprise other combinations of features from the described embodiments and/or the dependent claims with the features of the independent claims, and not solely the combinations explicitly set out in the claims. It is also noted herein that while the above describes example embodiments of the disclosure, these descriptions should not be viewed in a limiting sense. Rather, there are variations and modifications which may be made without departing from the scope of the present disclosure as defined in the appended claims.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   at least one processor;
   at least one memory including computer program code, the memory and the computer program code configured to, working with the processor, cause the apparatus to perform at least the following:
   collect data related to a plurality of mobile wireless electronic devices connected to a wireless local area network, wherein the wireless local area network includes at least two different predetermined regions serviced by the same access point;

analyze the data to create multi-temporal subscriber session analytic data, wherein the multi-temporal subscriber session analytic data includes at least a time indication of when each of the plurality of electronic devices were connected to the wireless local area network, a duration indication of how long each of the plurality of electronic devices were connected to the wireless local area network, and a location indication of a general area where each of the plurality of electronic devices were located when connected to the wireless local area network;

determine, using the subscriber session analytic data, at least two subscriber session policies for the wireless local area network, wherein each of the subscriber session policies includes one or more policy conditions, wherein each policy condition includes a directive to be followed when a time condition, a duration condition, and/or a location condition is satisfied, wherein the location condition is correlated to one of the at least two predetermined regions, wherein each of the at least two predetermined regions include a different subscriber session policy;

determine that a specific mobile wireless electronic device enters the wireless local area network;

determine current subscriber session analytic data for the specific electronic device, wherein the current subscriber session analytic data includes at least a time indication of when the specific electronic device entered the wireless local area network and a location indication of a general area where the specific electronic device is located, wherein the location indication is correlated to one of the at least two predetermined regions; and perform resource allocation based, at least in part, on the current subscriber session analytic data satisfying a time condition and/or a location condition of a specific policy condition, wherein a specific directive associated with the specific policy condition indicates that the resource allocation includes a shortened subscriber keep-alive timer.

2. The apparatus of claim 1, wherein each subscriber session policy correlates data indicative of at least one subscriber session condition with data indicative of at least one subscriber session directive.

3. The apparatus of claim 1, wherein each policy condition also includes a user equipment dwell time condition or a subscriber session count condition.

4. The apparatus of claim 1, wherein the subscriber session analytic data also includes a user equipment dwell time indication or a subscriber session count indication.

5. The apparatus of claim 1, wherein the memory further includes computer program instructions that, when executed by the at least one processor, cause the apparatus to perform receipt of the subscriber session analytic data, wherein the determination of at least one of the subscriber session policies for the wireless local area network is based, at least in part, on the subscriber session analytic data.

6. The apparatus of claim 1, wherein the memory further includes computer program instructions that, when executed by the at least one processor, cause the apparatus to perform:
receipt of the subscriber session analytic data from at least one of a memory or a separate apparatus;
determination of a changed subscriber session analytic data based, at least in part, on the current subscriber session analytic data and the subscriber session analytic data; and
storage of the changed subscriber data analytic data in at least one memory.

7. The apparatus of claim 1, wherein the memory further includes computer program instructions that, when executed by the at least one processor, cause the apparatus to perform:
receipt of the subscriber session analytic data, wherein the determination of one of the at least two subscriber session policies comprises:
receipt of a specific subscriber session policy from at least one of memory or a separate apparatus;
modification of the received specific subscriber session policy based, at least in part, on the subscriber session analytic data; and
storage of the modified specific subscriber session policy in at least one memory.

8. The apparatus of claim 1, wherein the access point is an IEEE 802.11 based access point.

9. The apparatus of claim 1, wherein one predetermined region is an area inside a building.

10. A method comprising:
collecting data related to a plurality of mobile wireless electronic devices connected to a wireless local area network, wherein the wireless local area network includes at least two different predetermined regions serviced by the same access point;
analyzing the data to create multi-temporal subscriber session analytic data, wherein the multi-temporal subscriber session analytic data includes at least a time indication of when each of the plurality of electronic devices were connected to the wireless local area network, a duration indication of how long each of the plurality of electronic devices were connected to the wireless local area network, and a location indication of a general area where each of the plurality of electronic devices were located when connected to the wireless local area network;
determining, using the subscriber session analytic data, at least two subscriber session policies for the wireless local area network, wherein each of the subscriber session policies includes one or more policy conditions, wherein each policy condition includes a directive to be followed when a time condition, a duration condition, and/or a location condition is satisfied, wherein the location condition is correlated to one of the at least two predetermined regions, wherein each of the at least two predetermined regions includes a different subscriber session policy;
determining that a specific mobile wireless electronic device enters the wireless local area network;
determining current subscriber session analytic data for the specific electronic device, wherein the current subscriber session analytic data includes at least a time indication of when the specific electronic device entered the wireless local area network and a location indication of a general area where the specific electronic device is located, wherein the location indication is correlated to one of the at least two predetermined regions; and
performing resource allocation based, at least in part, on the current subscriber session analytic data satisfying a time condition and/or a location condition of a specific policy condition, wherein a specific directive associated with the specific policy condition indicates that the resource allocation includes a shortened subscriber keep-alive timer.

11. The method of claim 10, wherein each subscriber session policy correlates data indicative of at least one subscriber session condition with data indicative of at least one subscriber session directive.

12. The method of claim 10, further comprising:
storing the subscriber session analytic data in memory.

13. The method of claim 10, further comprising:
receiving the subscriber session analytic data from at least one of a memory or a separate apparatus;
determining a changed subscriber session analytic data based, at least in part, on the current subscriber session analytic data and the subscriber session analytic data; and
storing the changed subscriber data analytic data in memory.

14. The method of claim 10, further comprising receipt of multi-temporal subscriber session analytic data, wherein the determination of at least one of the subscriber session policies comprises:
receipt of at least one of the subscriber session policies from at least one of memory or a separate apparatus;
modification of the received subscriber session policy based, at least in part, on the subscriber session analytic data; and
storage of the modified subscriber session policy in at least one memory.

15. The method of claim 10, wherein the performance of the resource allocation comprises causation of setting at least one subscriber session management parameter based, at least in part, on a specific subscriber session policy and the current subscriber session analytic data.

16. At least one non-transitory computer-readable media encoded with instructions that, when executed by a processor, perform:
collecting data related to a plurality of mobile wireless electronic devices connected to a wireless local area network, wherein the wireless local area network includes at least two different predetermined regions serviced by the same access point;
analyzing the data to create multi-temporal subscriber session analytic data, wherein the multi-temporal subscriber session analytic data includes at least a time indication of when each of the plurality of electronic devices were connected to the wireless local area network, a duration indication of how long each of the plurality of electronic devices were connected to the wireless local area network, and a location indication of a general area where each of the plurality of electronic devices were located when connected to the wireless local area network;
determining, using the subscriber session analytic data, at least two subscriber session policies for the wireless local area network, wherein each of the subscriber session policies includes one or more policy conditions, wherein each policy condition includes a directive to be followed when a time condition, a duration condition, and/or a location condition is satisfied, wherein the location condition is correlated to one of the at least two predetermined regions, wherein each of the at least two predetermined regions includes a different subscriber session policy;
determining that a specific mobile wireless electronic device enters the wireless local area network;
determining current subscriber session analytic data for the specific electronic device, wherein the current subscriber session analytic data includes at least a time indication of when the specific electronic device entered the wireless local area network and a location indication of a general area where the specific electronic device is located, wherein the location indication is correlated to one of the at least two predetermined regions; and
performing resource allocation based, at least in part, on the current subscriber session analytic data satisfying a time condition and/or a location condition of a specific policy condition, wherein a specific directive associated with the specific policy condition indicates that the resource allocation includes a shortened subscriber keep-alive timer.

17. The media of claim 16, wherein each subscriber session policy correlates data indicative of at least one subscriber session condition with data indicative of at least one subscriber session directive.

18. The media of claim 16, encoded with instructions that, when executed by a processor, perform receipt of subscriber session analytic data, wherein the determination of the at least two subscriber session policies for the wireless local area network is based, at least in part, on the subscriber session analytic data.

19. The media of claim 16, wherein the performance of the resource allocation comprises causation of setting at least one subscriber session management parameter based, at least in part, on a specific subscriber session policy and the current subscriber session analytic data.

20. The apparatus of claim 1, wherein the subscriber session analytic data includes electronic device location data to help indicate that the electronic device is inside a predetermined region.

* * * * *